United States Patent
Rhee

(10) Patent No.: US 8,234,973 B1
(45) Date of Patent: Aug. 7, 2012

(54) DISPOSABLE LINER FOR A COOKING GRILL HAVING DEFINED AREAS OF PERFORATION

(76) Inventor: Kyung Tai Rhee, Little Silver, NJ (US)

( * ) Notice: Subject to any disclaimer, the term of this patent is extended or adjusted under 35 U.S.C. 154(b) by 1150 days.

(21) Appl. No.: 11/895,435

(22) Filed: Aug. 24, 2007

Related U.S. Application Data

(63) Continuation-in-part of application No. 11/004,507, filed on Dec. 6, 2004, now abandoned.

(51) Int. Cl.
*A47J 37/07* (2006.01)
(52) U.S. Cl. ............................................. 99/450; 99/444
(58) Field of Classification Search ............ 99/444–450; 126/25 R, 41 R; 211/135
See application file for complete search history.

(56) References Cited

U.S. PATENT DOCUMENTS

| | | | | |
|---|---|---|---|---|
| 833,529 A * | 10/1906 | Jones | ............................... | 99/445 |
| 1,819,660 A | 8/1931 | Stone | | |
| 3,211,082 A * | 10/1965 | Sachnoff et al. | ................. | 99/444 |
| 3,470,572 A | 10/1969 | Wasserman | ....................... | 7/14.1 |
| 4,673,425 A | 6/1987 | Hirs | ................................ | 55/435 |
| D311,339 S * | 10/1990 | Weed | ............................. | D9/456 |
| 4,969,449 A * | 11/1990 | Levin | ............................. | 126/332 |
| D318,235 S * | 7/1991 | Weed | ............................. | D9/456 |
| 5,277,106 A * | 1/1994 | Raymer et al. | .................. | 99/447 |
| 5,447,097 A * | 9/1995 | Rhee | ............................... | 99/450 |
| 5,586,491 A * | 12/1996 | Diller et al. | ...................... | 99/450 |
| 6,314,871 B1 * | 11/2001 | Holbrook et al. | .............. | 99/401 |
| 6,966,253 B2 * | 11/2005 | Witzel | ............................. | 99/400 |
| 7,104,187 B1 * | 9/2006 | Robinson | ......................... | 99/445 |

* cited by examiner

*Primary Examiner* — Henry Yuen
*Assistant Examiner* — Jianying Atkisson
(74) *Attorney, Agent, or Firm* — LaMorte & Associates PC

(57) ABSTRACT

A liner used to line the grills of barbecues and other types of cooking grill structures. The liner has at least one solid section and at least one perforated section that runs along the length of the liner. The liner is also shaped in a sinusoidal pattern that fits over the parallel rods on a cooking grill. The liner is placed onto a cooking grill above the burners. The solid section of the liner is placed directly above the burners. The perforated sections are not. As such, the liner allows drippings to flow away from the food and fall into the barbecue only in areas where the drippings will not ignite. Thus, the liner eliminates the major cause of fire flare-up when cooking on an open flame grill.

13 Claims, 5 Drawing Sheets

DISPOSABLE LINER FOR A COOKING GRILL HAVING DEFINED AREAS OF PERFORATION

RELATED APPLICATIONS

This application is a continuation-in-part of U.S. patent application Ser. No. 11/004,507, entitled DISPOSABLE LINER For A Cooking Grill Having Defined Areas Of Perforation, filed Dec. 6, 2004

BACKGROUND OF THE INVENTION

1. Field of the Invention

The present invention relates to sanitary protective liners for cooking grills, such as barbecue grills and the like. More particularly, the present invention relates to liners made of foil that conform to the bar structure of the grill and are perforated to enable the free flow of gas and material across the plane of the grill.

2. Description of the Prior Art

When cooking upon a grill over an open flame or coals, the bars of the grill become covered with the burnt drippings of the food being cooked and carbon deposits from the below lying flame. Accordingly, the grill must be periodically cleaned. This required maintenance is time consuming and dirty work which discourages people from cooking upon grills.

Cooking upon a grill has many well known benefits. For instance, cooking on a grill adds a smoked flavor to the prepared food and cooking on a grill produces food with less fat content than if the food were fried. Such benefits are typically lost when many traditional liners are placed over a grill. For example, one of the most common types of liners traditionally used to cover grills is aluminum foil. The reason why aluminum foil is so commonly used is that it is easy to place on a grill of any size and easy to remove. However, the aluminum foil is solid, thereby preventing both gases from rising through the grill and fatty drippings from flowing away from the food. As is exemplified by U.S. Pat. No. 3,470,572 to Wassermann, entitled Tool For Applying A Protective Foil To The Individual Rods Of A Barbecue Grill, devices have been created in the prior art that cut aluminum foil into small pieces shaped to cover only rod structures of a grill. Such devices are useful, but the application and removal of aluminum foil applied in such a manner is still highly time consuming and labor intensive.

To avoid the time and labor involved in applying foil to the individual rods of a grill, a person may use a perforated structure such as a broiling pan grid, wherein the broiling pan grid can be placed directly over the grill. Such broiling pan grids are commonplace in the kitchen and are exemplified by U.S. Pat. No. 1,819,660 to Stone, entitled Broiling Device. The problem with such devices is that they rarely match the exact size of the below lying grill. As such, the cooking surface is typically reduced. Additionally, many such broiling pan grids are not disposable and must be cleaned, thereby defeating the original purpose of the grill cover.

Disposable liners have been invented for various items such as paint trays, baking dishes and the like. Such a liner is exemplified by U.S. Pat. No. 4,673,425 to Hirs, entitled Disposable Liner For Paint Booth Grating. The disadvantage of such liners is that they are configured to fit over a specifically shaped structure and cannot be applied to a structure of a different shape. Accordingly, such liners are not adaptable for use over cooking grills such as those found in barbecues since barbecue grills are manufactured in a large number of shapes and styles. Depending upon the manufacturer of a barbecue grill, the barbecue grill will have different bar sizes, different size spaces between bars, different cross bar configurations and different surface areas.

In U.S. Pat. No. 5,447,097 to Rhee, entitled Disposable Liner For A Cooking Grill, a foil liner is described that is designed to cover the grill rods present in many modern barbecues. The liner is contoured and perforated to fit over a variety of cooking grill structures. However, the liner is uniformly perforated. As such, the liner allows drippings from the food to drip through the liner at all points.

U.S. Pat. No. 5,586,491 to Diller, entitled Disposable Barbeque Grill Shield discloses a foil liner that has a thin solid section in its center. The solid center section is flanked on both sides by large perforated areas. Accordingly, only a small strip of the foil liner is impermeable and the liner allows drippings from food to drip through the liner close to the center of the liner.

Many modern barbecue designs have burners located in the center of the barbecue. Metal baffles are placed over the burners that disperse the heat of the central burner. The baffles are typically located directly above the burner in the center of the barbecue. Since the heat baffles are directly above the open flame of the burners, the heat baffles become very hot. As a result, any fat that may drip onto the heat baffle has a tendency to ignite and burn.

There are also barbecues that use sloped cooking grills. In a barbecue with a sloped grill, the grill is typically sloped around a central burner so that most all points on the sloped grill are uniform in distance from the heat of the central burner.

It has been observed that many barbecues with central burners and/or sloped grills work better if fat drippings are prevented from dripping onto the heat baffles located over the burner. If fat drippings can be prevented from dripping onto the heat baffles, the drippings will not catch on fire and cause the barbecue to flare up and burn the food being cooked.

A problem exists in that prior art barbecue grill covers are either solid, and do not let drippings move away from the food, or the liners are uniformly perforated and allow drippings to fall onto surfaces where they might catch fire. A need therefore exists for a new type of barbecue liner that allows drippings to move away from the food being cooked, yet directs those drippings to designated areas within the barbecue where they will not catch on fire. This need is met by the present invention as described and claimed below.

SUMMARY OF THE INVENTION

The present invention is a liner used to line the grills of barbecues and other types of cooking grill structures. The liner has at least one solid section and at least one perforated section that runs along the length of the liner. The liner is also shaped in a sinusoidal pattern that fits over the parallel rods on a cooking grill.

The liner is placed onto a cooking grill above the burners. The solid section of the liner is placed directly above the burners. The perforated sections are not. As such, the liner allows drippings to flow away from the food and fall into the barbecue only in areas where the drippings will not ignite. Thus, the liner eliminates the major cause of fire flare-up when cooking on an open flame grill.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE PRESENT INVENTION

Although the present invention liner can be used on many types of cooking surfaces, such as broiling pans, oven racks and the like, the present invention liner is particularly well suited for use on the cooking grill of a gas-fired barbecue. Accordingly, the present invention liner will be described in an application where it is applied to the cooking grill of a barbecue in order to set forth the best mode contemplated for the invention.

Figure 1:
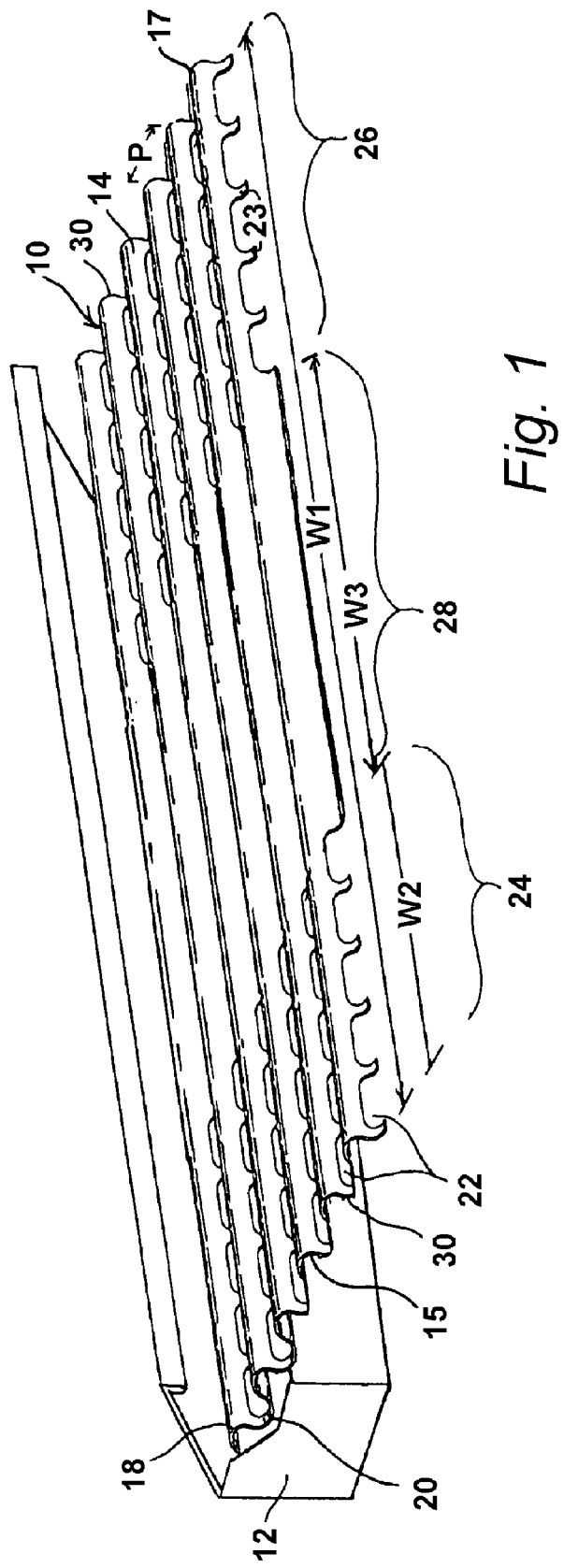
FIG. 1 is a perspective view of an exemplary embodiment of a length of the present invention liner.

Referring to FIG. 1, there is shown a length of the present invention liner 10, being wound on a storage roll 12. The liner 10 has a width W1, which is preferably between ten inches and eighteen inches. The length of the liner 10 wound upon a roll 12 can be several feet. As such, it will be understood that the liner 10 can be pulled from the roll 12 and cut to any convenient length for use on a barbecue.

The liner 10 is preferably made of an aluminum alloy foil 14 having a gauge thickness of between 0.05 mm and 0.3 mm. The aluminum alloy foil 14 can be plain or may be coated with at least one non-stick material 16 that reduces adherence between the cooking food and the aluminum alloy foil 14.

The aluminum alloy foil 14 has two opposite side edges 15, 17 that run the length of the foil 14. The side edges 15, 17 run parallel since the foil 14 has a uniform width throughout its length.

The aluminum alloy foil 14 is stamped into a sinusoidal configuration having rows of parallel crests 18 interposed between rows of parallel troughs 20. The parallel crests 18 and the parallel troughs 20 are both perpendicular to the side edges 15, 17 of the aluminum allot foil 14. The pitch P in between subsequent crests 18 is preferably between 6.4 mm and 25.4 mm. However, smaller or larger pitch sizes may be used. The radius of the curve forming each crest 18 is preferably between 5.1 mm and 10.2 mm so as to accommodate the radius of most traditional barbecue cooking grill bars. The gauge thickness of the aluminum alloy foil 14 is thin enough to enable the liner 10 to be easily deformed by hand. Accordingly, if the pitch P of the sinusoidal configuration does not match the spacing of the bars on the barbecue grill, the liner 10 can be manually stretched or compressed, thereby changing the pitch P until the pitch P matches the spacing on the barbecue grill.

The liner 10 is perforated in discrete sections. In the shown embodiment, the liner 10 has perforations 22 in two side sections 24, 26 that run along the length of the liner 10. The liner 10 also has a central section 28 that is not perforated. The two perforated side sections 24, 26 have a width W2 that is preferably between one-fourth and one-third of the overall width W1 of the liner 10. It will therefore be understood that the width W3 of the central section 28 is at least half the overall width W3 of the liner. Having a solid central section 28 that is have the width of the foil 14 is important because it provides a surface wide enough to span the heating elements of the barbeque and wide enough to cook upon.

The perforations 22 in the two perforated side sections 24, 26 preferably do not extend to the side edges 15, 17 of the liner 10. In this manner, the perforations 22 do not communicate with the edges 30 of the liner 10. The liner 10 therefore has solid edges 30 that allow the liner 10 to be pulled from the roll 12 without inadvertently tearing.

Furthermore, it should be noted that the multiple perforations 22 are used in an aligned orientation rather than one long slot. The perforations 22 preferably have a length no longer than one inch. This leaves bridges 23 between the perforations 22. The bridges 22 prevent the perforations from buckling and tearing across the liner 10 as the liner is pulled from the roll 12.

Figure 2:
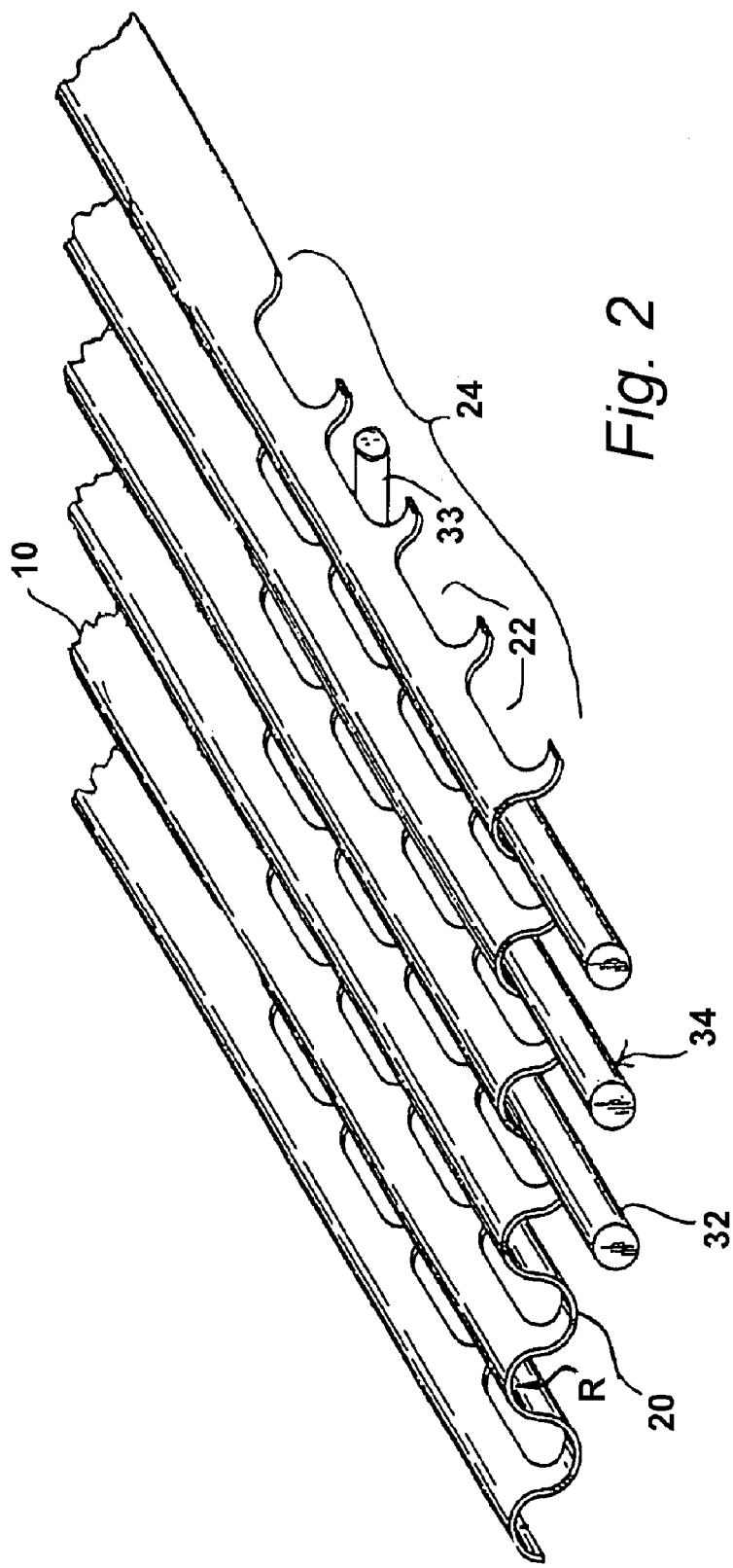
FIG. 2 is a fragmented view of the exemplary liner shown in conjunction with rods from a barbecue grill.

Referring to FIG. 2, the present invention liner 10 is shown positioned over the parallel bars 32 of a traditional barbecue grill 34. It can be seen that within the perforated side sections 24, 26, the perforations 22 are formed through the liner 10 within the troughs 20. The presence of the perforations 22 enable the heat and hot gases produced by the flame of the barbecue grill to directly pass through the perforated side sections 24, 26 and act upon any food being cooked upon the liner 10. Similarly, any drippings, barbecue sauce or like material that flows from the food and flows across the two perforated side sections 24, 26 flows into the troughs 20 and drips down through the perforations 22.

Although the shown embodiment illustrates oblong perforations 22, it should be understood that round apertures or any other geometrical shape may be used. Shapes with rounded corners are preferred over shapes with sharp corners to help prevent the liner 10 from tearing should the liner 10 be stretched when applied to the barbecue grill 34. Despite the geometrical configuration of the perforations 22, it is preferred that the depth of each of the perforations 22 extend from the base of each trough 20 to a point midway in between the low point of the trough 20 and the high point of the crest 18. The perforations 22 in each of the troughs 20 align with one another in straight rows that travel perpendicular to the direction of the grill bars 32. Accordingly, if the barbecue grill 34 contains cross bars 33 that travel perpendicular to the grill bars 32, these cross bars 33 pass into the reliefs defined by the perforations 22, therein helping the liner 10 engage the barbecue grill.

It will be understood that the pitch of the sinusoidal pattern on the present invention liner 10 may not always exactly match the bar spacing on the barbecue grill. As such, the liner 10 may be first pulled or compressed to come close to the required spacing. The liner 10 can then be pressed down against the cooking grill 34, whereby the liner 10 will conform to the cooking grill 34.

Figure 3:
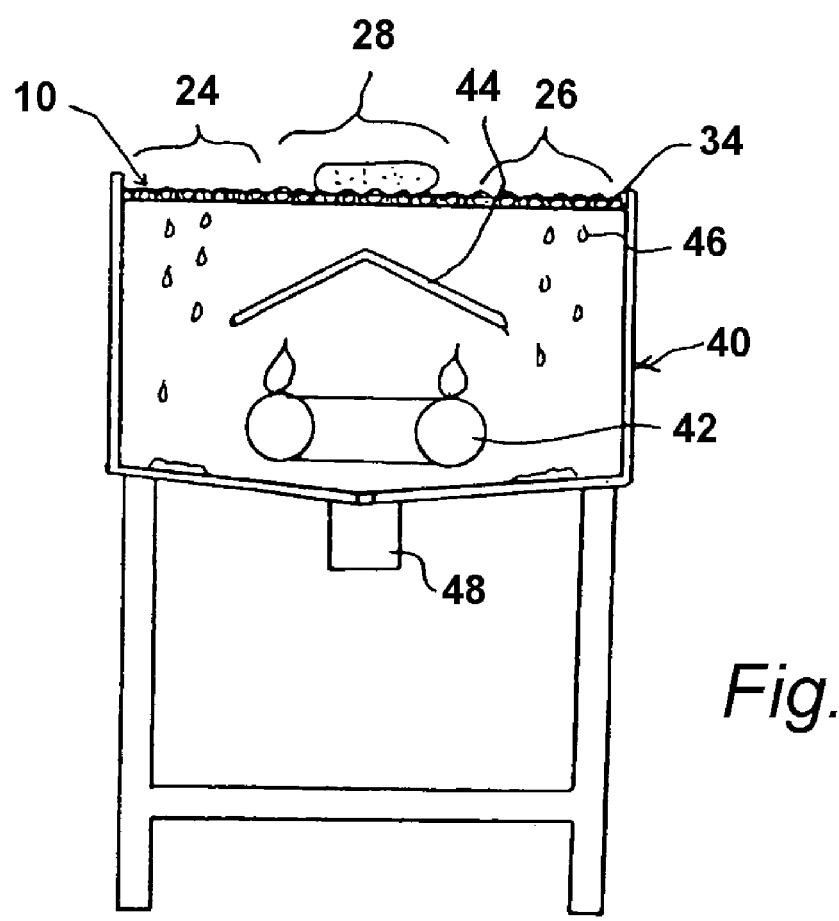
FIG. 3 is a cross-sectional view of the liner of FIG. 1 being applied to a barbecue with a central burner.

Referring to FIG. 3, a cross-section of a gas-fired barbecue 40 is shown. The barbecue 40 has a burner 42 that runs down the center of the barbecue 40. A heat baffle 44 is disposed above the central burner 42. The heat baffle 44 disperses the heat of the central burner 42 so that the heat generated by the central burner 42 is generally evenly distributed across the bottom of the cooking grill 34.

The present invention liner 10 is applied across the top of the cooking grill 34. The two perforated side sections 24, 26 of the liner 10 are oriented toward the side edges of the cooking grill 34. The non-perforated central section 28 lay across the cooking grill 34 above the heat baffle 44. As a result, drippings 46 from the food pass into the troughs 20 of the liner 10 and are taken out of contact with the cooking food. These drippings 46 cannot pass through the central section 28 of the liner 10. The drippings 46 therefore either evaporate or flow toward the perforated side sections 24, 26 of the liner 10.

Once the drippings 46 reach the perforated side sections 24, 26, the drippings 46 pass through the liner 10 and fall into the barbecue 40 below the cooking grill 34. Since the drippings 46 do not drip onto the heat baffle 44, the drippings 46 do not contact any surface hot enough to cause the drippings 46 to ignite. Rather, the drippings 46 either evaporate in the barbecue 40 or pass into catch basins 48 below the barbecue 40.

Figure 4:
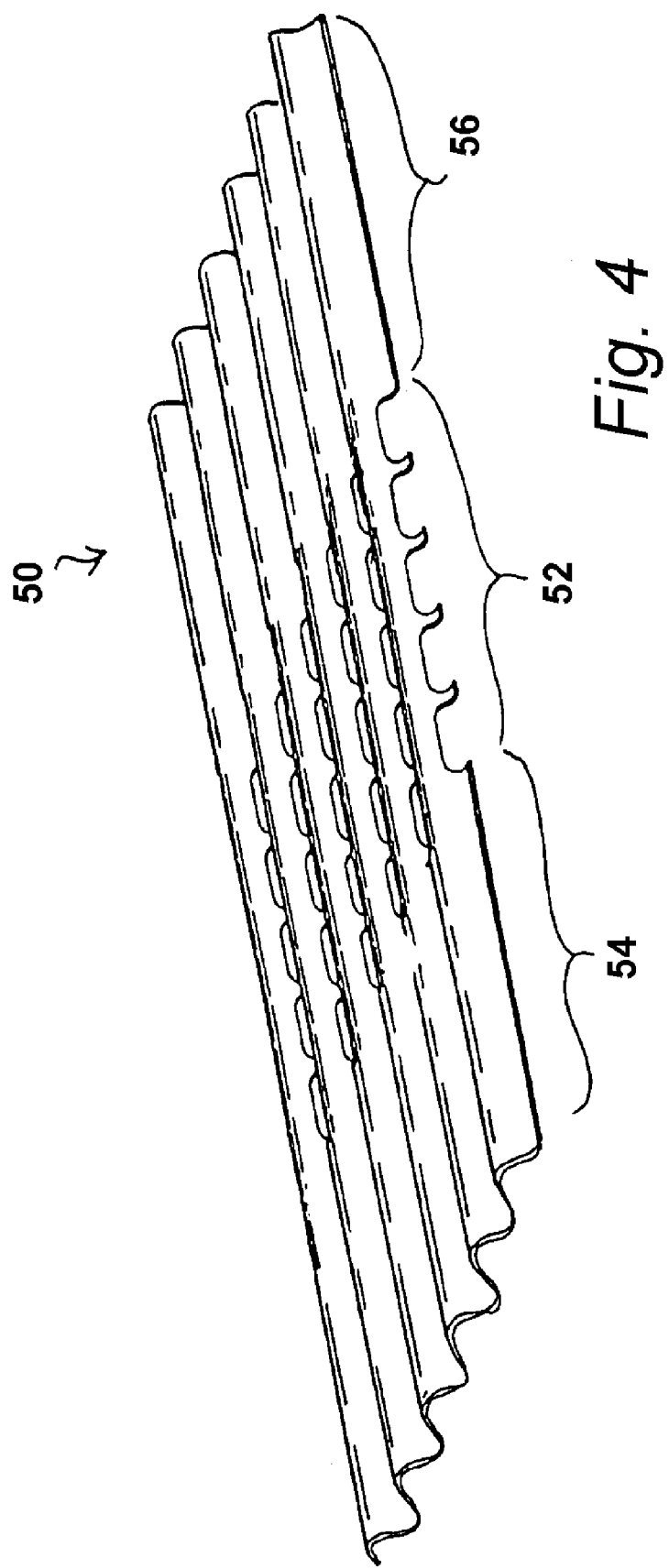
FIG. 4 is a perspective view of an alternate embodiment of the present invention liner.

Referring to FIG. 4, an alternate embodiment of the present invention liner 50 is shown. The liner 50 has the same sinusoidal pattern, containing troughs and crests. However, in the shown embodiment of the liner 50, the liner 50 has a perforated center section 52 and non-perforated side sections 54, 56. The perforated center section 52 is disposed down the center of the liner 50 and runs the length of the liner 50. The width of the perforated center section 52 is preferably between one-third and one-half the overall width of the liner 50. The non-perforated side sections 54, 56 therefore combine to take up at least half of the overall width of the liner 50. The perforated center section 52 has perforations at the bottom of the troughs, in the same manner as was previously described with reference to FIG. 2.

Figure 5:
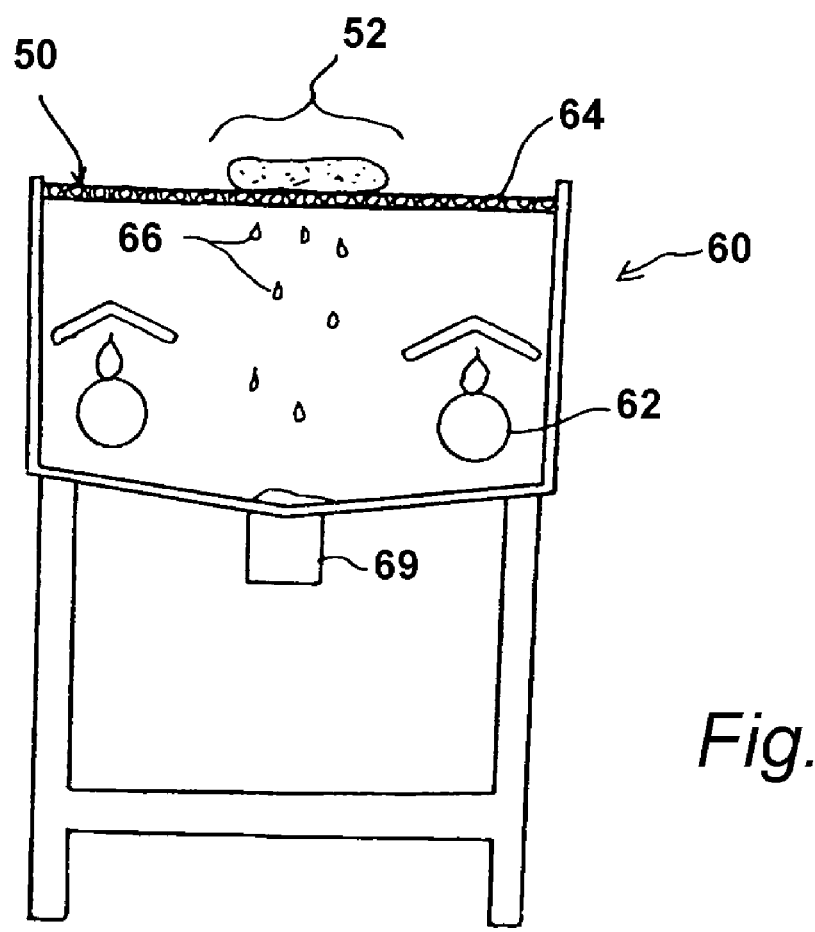
FIG. 5 is a cross-sectional view of the liner of FIG. 4 being applied to a barbecue with a peripheral burner.

Referring to FIG. 5, an alternate embodiment of a barbecue 60 is shown. In this embodiment, the gas burners 62 run along the outside of the barbecue 60 and under the periphery of the cooking grill 64. The cooking grill 64 itself is slightly sloped towards its center. Such barbecue designs are often used when slow cooking large roasts, wherein the slope of the cooking grill 64 helps center the roast in the barbecue.

The liner 50 of FIG. 4 is applied to the top of the cooking grill 64. The liner 50 has a perforated center section 52. Thus, the liner 50 allows drippings 66 from the food to drip into the center of the barbecue 60. Since the gas burners 62 and heat baffles 68 are located along the sides of the barbecue 60, the drippings 66 do not contact any surface hot enough to ignite the drippings 66. Rather, the drippings 66 simply fall into the barbecue 60 and evaporate, or pass through the barbecue 60 into collection basins 69 under the barbecue 60.

It will therefore be understood that the present invention is a cooking grill liner that is not fully perforated. In this manner, the liner allows drippings to flow away from the food being cooked, but does not allow those drippings to drip onto the burner and ignite. Thus, the liner eliminates the major cause of fire flare-up when cooking on an open flame grill.

It will be understood that the embodiments of the present invention liner that are shown are merely exemplary. Thus, a person skilled in the art can make variations and modifications to the described embodiments utilizing functionally equivalent components and alternate configurations. All such variations and modifications are intended to be included within the scope of the present invention as defined by the appended claims.

What is claimed is:

1. A disposable liner for temporarily covering grill bars of a cooking grill when cooking food to prevent said food from directly contacting said cooking grill, said liner comprising:
   a sheet of metal foil having a predetermined length, a predetermined width and side edges that run along said length, said sheet of metal foil being formed into a generally sinusoidal pattern that defines a plurality of parallel troughs and crests that run perpendicular to said side edges in between said side edges, wherein said plurality of parallel troughs have low points and said plurality of crest have high points;
   said sheet of metal foil having a solid central section, without perforations, that runs along said length of said sheet of metal foil and two perforated side sections that run along said length of said sheet of metal foil, wherein said solid central section is interposed between said two perforated side sections;
   wherein said two perforated side sections have perforations that are disposed only in said plurality of parallel troughs, wherein said perforations extend from said low points of said plurality of parallel troughs to points midway to said high points of said crests and said perforations run perpendicular to said side edges; and
   wherein said solid central section is as wide as at least half of said predetermined width of said sheet of metal foil.

2. The liner according to claim 1, wherein a plurality of perforations are disposed in each of said plurality of parallel troughs, wherein each of said perforations extend a length along said trough no greater than one inch.

3. The liner according to claim 1, further including a coating of non-stick material covering said sheet of metal foil, wherein said coating of non-stick material deters the adhesion of food to said sheet of metal foil during cooking.

4. The liner according to claim 1, wherein said two perforated areas are disposed proximate said side edges.

5. The liner according to claim 4, wherein said side edges are solid and are not intersected by any of said perforations.

6. The liner according to claim 1, wherein said sheet of metal foil is between 0.05 mm and 0.3 mm thick.

7. A disposable liner for temporarily covering grill bars of a cooking grill, when cooking food to prevent said food from directly contacting said cooking grill, said liner comprising:
   a sheet of metal foil having a predetermined length, a predetermined width and side edges that run along said length, said sheet of metal foil being formed into a generally sinusoidal pattern that defines a plurality of parallel troughs and crests that run perpendicular to said side edges in between said side edges, wherein said plurality of parallel troughs have low points and said plurality of crests have high points;
   said sheet of metal foil having a perforated central section that runs along said length of said sheet of metal foil and two solid side sections that run along said length of said sheet of metal foil, wherein said two solid side sections have no perforations, and wherein said perforated central section is interposed between said two solid side sections;
   wherein said perforated central section has perforations disposed only in said plurality of parallel troughs wherein said perforations extend from said low points of said plurality of parallel troughs to points midway to said high points of said crests; and
   wherein said solid side sections have a combined width that is as at least as wide as half of said predetermined width of said sheet of metal foil.

8. The liner according to claim 7, wherein a plurality of perforations are disposed in each of said plurality of parallel troughs, and wherein each of said perforations extend a length along said trough no greater than one inch.

9. The liner according to claim 7, further including a coating of non-stick material covering said sheet of metal foil, wherein said coating of non-stick material deters the adhesion of food to said sheet of metal foil during cooking.

10. The liner according to claim 7, wherein two solid side sections are disposed proximate said side edges.

11. The liner according to claim 7, wherein said sheet of metal foil is between 0.05 mm and 0.3 mm thick.

12. In a barbecue having a cooking grill and burners disposed under said cooking grill, a method of lining said cooking grill with a disposable liner, comprising the steps of:

provoding a sheet of metal foil having a predetermined length, a predetermined width and side edges that run along said length, said sheet of metal foil being formed into a generally sinusoidal pattern that defines a plurality of parallel troughs and crests that run perpendicular to said side edges in between said side edges, wherein said plurality of parallel troughs have low points and said crests have high points;

said sheet of metal foil having a solid central section without perforations and perforated sections that runs along said length of said sheet of metal foil between said solid central section and said side edges, wherein each of said perforated sections has perforations disposed only in said plurality of parallel troughs, wherein said perforations extend from said low points of said plurality of parallel troughs to points midway to said high points of said crests and said solid central section runs along said length of said sheet of metal foil, wherein said solid central section has a width that is as at least as wide as half of said predetermined width of said sheet of metal foil; and lining the cooking grill with said metal foil, wherein said solid central section is disposed above the burners, thereby preventing material from falling through the cooking grill onto the burners.

13. The method according to claim 12, wherein said step of lining the cooking grill with said metal foil includes laying said metal foil on the cooking grill so that said solid central section of said metal foil is centered along the cooking grill.

\* \* \* \* \*